United States Patent
Bindler

(10) Patent No.: US 6,244,851 B1
(45) Date of Patent: Jun. 12, 2001

(54) DEVICE FOR PRODUCING CHOCOLATE SHELLS

(75) Inventor: Uwe Bindler, Bergneustadt (DE)

(73) Assignee: Gebr. Bindler Maschinenfabrik GmbH & Co. KG, Bergneustadt (DE)

( * ) Notice: Subject to any disclaimer, the term of this patent is extended or adjusted under 35 U.S.C. 154(b) by 0 days.

(21) Appl. No.: 09/219,191

(22) Filed: Dec. 23, 1998

(30) Foreign Application Priority Data

Dec. 30, 1997 (DE) .............................. 197 58 169

(51) Int. Cl.⁷ ..................................... A23G 1/21
(52) U.S. Cl. ........................ 425/347; 425/453; 425/359
(58) Field of Search ................................. 425/347, 349, 425/453, 454, 358, 359

(56) References Cited

U.S. PATENT DOCUMENTS 4,385,882 * 5/1983 Cloud et al. ......................... 425/91
4,822,268   4/1989 Bindler et al. ..................... 425/454

FOREIGN PATENT DOCUMENTS

| 1202722 | 10/1965 | (DE) . |
| 3618904 | 12/1987 | (DE) . |
| 3920907 | 9/1990 | (DE) . |
| 0589820 | 3/1994 | (EP) . |
| 0715813 | 6/1996 | (EP) . |

* cited by examiner

Primary Examiner—Nam Nguyen
Assistant Examiner—Donald Heckenberg
(74) Attorney, Agent, or Firm—Proskauer Rose LLP

(57) ABSTRACT

A device for producing a chocolate article, in particular a shell for hollow chocolate bodies, comprises a conveyor device having a first collecting line, from which chocolate molds can be discharged, and a second collecting line, which is parallel to the first collecting line, to receive the discharged molds. Each mold has at least one alveolus for receiving a liquid chocolate preparation, and at least one ram element for immersion into the alveolus. Each mold is conveyed along with its corresponding ram element from the first collecting line to the second collecting line.

7 Claims, 2 Drawing Sheets

DEVICE FOR PRODUCING CHOCOLATE SHELLS

BACKGROUND OF THE INVENTION

This invention concerns a device for producing a chocolate article, in particular a shell for hollow chocolate bodies, with a conveyor device for conveying molds, each having at least one alveolus for metering a liquid chocolate preparation, with each mold having at least one ram element by means of which a cooled ram element can be advanced to the minimum of one alveolus for immersion in the chocolate preparation while it is still liquid.

German Utility Model No. 9,419,672 G discloses a device for producing a chocolate article having a conveyor device for conveying molds. The molds have at least one alveolus for metering a liquid chocolate preparation and at least one ram element.

It is known from British Patent No. 207,974 to provide a cooled ram which is immersed in the liquid chocolate preparation in a chocolate mold, resulting in a hollow chocolate body of the desired thickness. Another device for producing chocolate articles is known from European Patent No. 589,820, where the ram which is immersed in the chocolate preparation is cooled to a temperature of at least 0° C.

European Patent No. EP 0 715 813 to Uwe Bindler, which is commonly owned by the assignee of the present application, discloses a conventional chocolate mold 2 having three alveoli 22, as shown in FIG. 2. The alveoli 22 are small cavities, or pits, and represent the outer surface of a hollow chocolate body which is produced by the mold. The mold has associated with it a ram or punching element 24. The ram has a plurality of stamps 26 which correspond directly with the alveoli 22, and are arranged as to fit into the alveoli. To produce hollow chocolate bodies, the alveoli 22 in the mold are filled with liquid ready-to-process chocolate preparation 28 and the ram 24, including the stamps 26, is moved towards the mold 2 such that the stamps reach at least partly into each respective alveolus and which partly displaces the chocolate already in the alveoli. As a result, the chocolate preparation 28 that remains in the space between the alveolus 22 and the stamp 26 forms the hollow chocolate shell. This is shown in FIG. 3. Preferably, the ram 24, and particularly the stamps 26, are cooled to form the hollow chocolate body.

SUMMARY OF THE INVENTION

The object of this invention is to provide an improved device for producing a chocolate article, with optimized manufacturing technology.

This object is achieved according to this invention by the fact that the conveyor device has a first collecting line from which the molds can be discharged individually and a second collecting line (1c) to accommodate the discharged molds, where each mold (2) together with the minimum of one ram element assigned to it can be moved from the first collecting line to the second.

This invention is characterized in that the molds which are conveyed serially in the conveyor device can be collected on the first collecting line, discharged from there, received by the second collecting line and conveyed there further serially in the desired order. Since the ram element and mold are moved together between the collecting lines, the remaining time in the transfer from the first collecting line to the second collecting line can be used for solidification of the chocolate preparation. Then the conveyance operation begins again.

The molds are then preferably conveyed through an air-conditioned dry air chamber, specifically together with the ram unit, i.e., they remain in the dry air chamber until the shells have solidified adequately.

BRIEF DESCRIPTION OF THE DRAWINGS

The invention is explained in greater detail below with reference to the drawings.

DETAILED DESCRIPTION OF THE INVENTION

Figure 1:
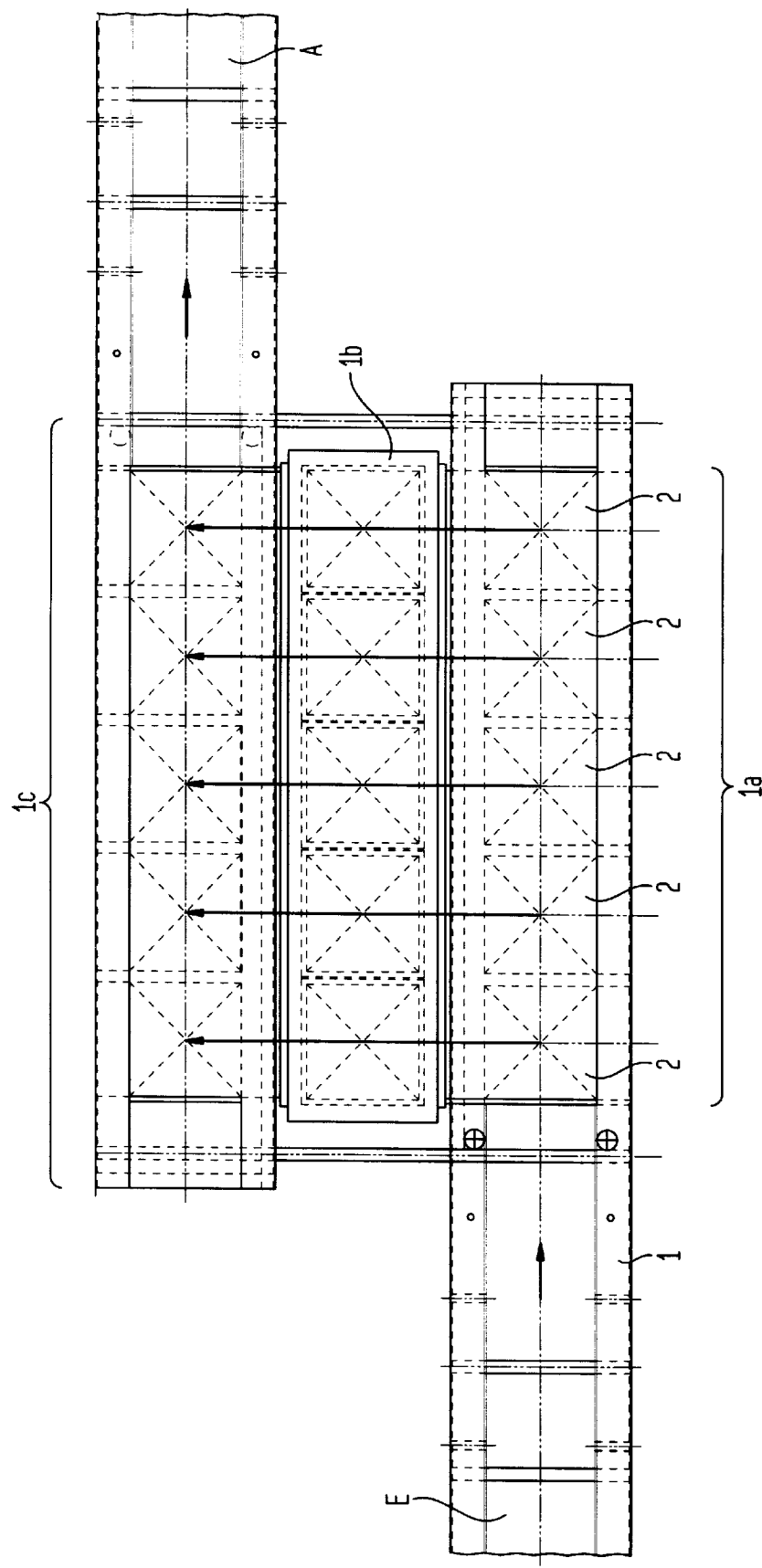
FIG. 1 shows a top view of a conveyor device 1 for casting molds 2 for producing chocolate shells.

The conveyor device 1 consists of a mold inlet area E, a mold outlet area A and an intermediate zone which is shown in detail. The intermediate zone consists of a first collecting line 1a, a second collecting line 1c and a dwell line 1b in between. The dwell line 1b is designed as an air-conditioned dry air chamber.

The individual molds 2 are first conveyed coming from inlet E in the direction of the lower horizontal arrow until molds 2 have reached the position shown with dotted lines at the bottom of the figure. The five molds 2 shown here are conveyed by pushing them one after the other until they have reached the position in the collecting line 1a.

Each mold 2 is then moved through drying chamber 1b in the direction of the vertical arrows. The individual molds 2 then go to the second subsection (1c) which is designed as a collecting line for the molds. From there, the molds are then conveyed again serially in the direction of the outlet A by pushing them one after the other.

Figure 2:
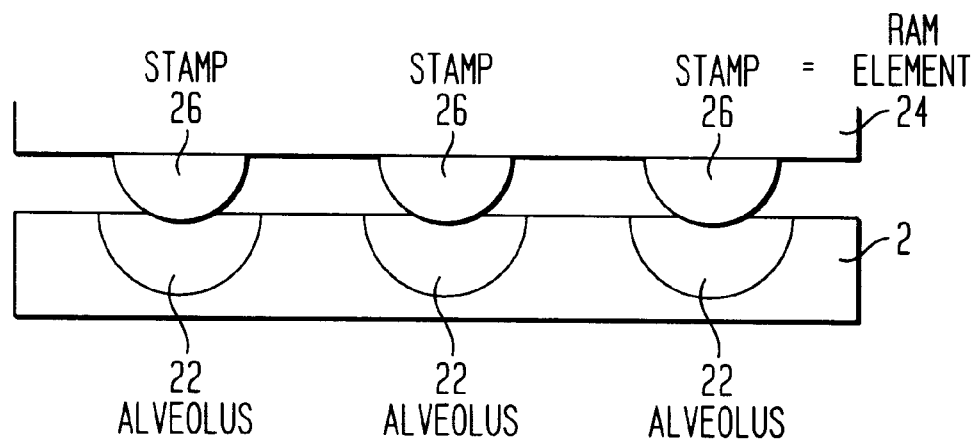
FIG. 2 shows a conventional chocolate mold with alveoil and ram elements.
Figure 3:
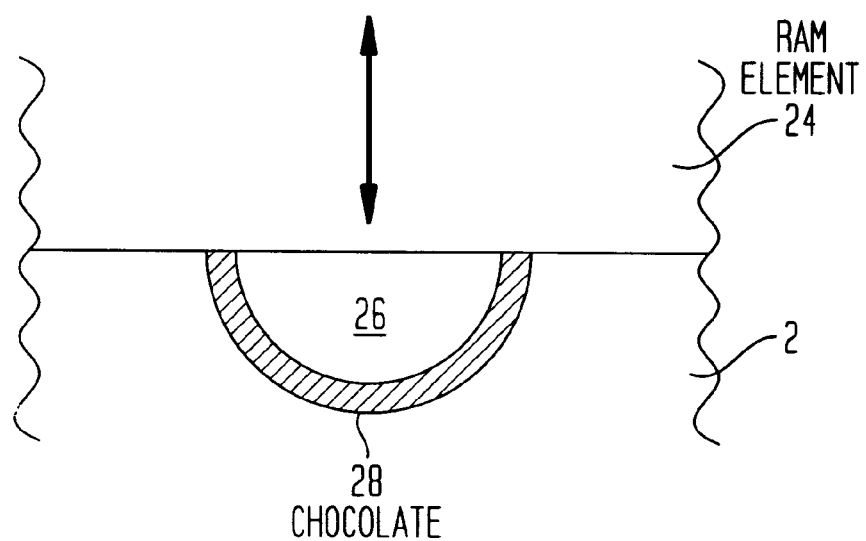
FIG. 3 shows actuation of the ram element with the alveolus of FIG. 2.

Each mold 2 has alveoli of the type shown in FIG. 2, on the top side; they are formed by depressions into which a certain quantity of liquid ready-to-process chocolate preparation is metered through a suitable metering device. After metering the chocolate preparation into the alveolus, the mold is moved with respect to a ram element, of the type shown in FIG. 3, so that the ram is lowered into the mold and raised again after a certain dwell time. The ram is cooled to a suitable temperature below room temperature to achieve faster solidification of the chocolate preparation in the alveolus.

During the passage through the dwell line (dry air chamber) 1b, the ram is conveyed together with the mold.

What is claimed is:

1. A device for producing a chocolate article comprising a conveyor device for conveying at least one chocolate mold, wherein each mold has at least one alveolus for receiving a liquid chocolate preparation and at least one ram element for immersion into the at least one alveolus, wherein the device further comprises:
   a first collecting line from which the molds can be discharged,
   a second collecting line situated parallel to the first collecting line for receiving the molds discharged from the first collecting line,
   wherein each mold and its corresponding ram element are moved perpendicularly from the first collecting line to the second connecting line, and
   a dwell line situated parallel to and between the first and second collecting lines, wherein the chocolate molds are maintained for a period of time.

2. The device of claim 1, wherein the chocolate article is a shell for a hollow chocolate body.

3. The device of claim 1 wherein the dwell line is a dry air chamber.

4. The device of claim 1 wherein the dwell line is an air-conditioned chamber.

5. The device of claim 1 wherein more than one mold is moved simultaneously through the dwell line.

6. The device of claim 1 wherein the chocolate molds are square.

7. The device of claim 1 wherein the chocolate molds are discharged serially from the first collecting line to the second collecting line.

* * * * *